(12) United States Patent
Troll

(10) Patent No.: US 6,470,109 B1
(45) Date of Patent: Oct. 22, 2002

(54) DETERMINING WAVEGUIDE POSITIONS AND ANGLES FOR EFFICIENT REFLECTIVE COUPLING

(75) Inventor: Mark A. Troll, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 175 days.

(21) Appl. No.: 09/590,754

(22) Filed: Jun. 8, 2000

(51) Int. Cl.[7] .............................. G02B 6/26; G02B 6/42
(52) U.S. Cl. .............................. 385/18; 385/16; 385/19; 385/50; 359/128
(58) Field of Search ............................... 385/14, 11, 40, 385/125, 39, 18, 16, 19, 50; 359/128

(56) References Cited

U.S. PATENT DOCUMENTS

| | | | |
|---|---|---|---|
| 3,990,059 A | * 11/1976 | Carlo et al | 340/174 |
| 4,988,157 A | 1/1991 | Jackel et al. | 350/96.13 |
| 5,436,991 A | * 7/1995 | Sunagawa et al. | 385/37 |
| 5,699,462 A | 12/1997 | Fouquet et al. | 385/18 |
| 5,960,131 A | 9/1999 | Fouquet et al. | 385/17 |
| 6,055,344 A | 4/2000 | Fouquet et al. | 385/16 |
| 6,320,994 B1 | * 11/2001 | Donald et al. | 385/16 |

* cited by examiner

*Primary Examiner*—Cassandra Spyrou
*Assistant Examiner*—Leo Boutsikaris

(57) ABSTRACT

An efficient optical coupling arrangement of waveguides is achieved by providing compensation for the Goos-Hänchen effect along a total internal reflection interface. In one embodiment, the lateral shift of reflected light along the interface is calculated in order to determine a distance between axes of two waveguides. The spacing between the axes may be calculated to maximize coupling of light having a transverse electric polarization or light having a transverse magnetic polarization. Preferably, the spacing between axes is established to minimize polarization dependent loss. In another embodiment of the invention, the incidence angles of the two waveguides are selected on the basis of achieving equal lateral shifts of the two polarizations, so that polarization dependent loss is minimized.

17 Claims, 6 Drawing Sheets

DETERMINING WAVEGUIDE POSITIONS AND ANGLES FOR EFFICIENT REFLECTIVE COUPLING

TECHNICAL FIELD

The invention relates generally to efficiently coupling optical waveguides and more particularly to determining the positions and angles of waveguides relative to a plane of total internal reflection.

BACKGROUND ART

Increasingly, signal transfers within a telecommunications or data communications environment are being carried out using optical networks. Information can be exchanged in the form of modulations of laser-produced light. The equipment for efficiently generating optical signals and the cables for transmitting the optical signals over extended distances are readily available. However, there are still some concerns with regard to enabling localized manipulation of signals without a significant sacrifice of signal strength. The localized manipulation may be a steady-state signal transfer arrangement between two waveguides or may be a switching arrangement in which an optical signal along one waveguide can be transferred to any one of a number of output waveguides.

One technique for redirecting an optical signal from one waveguide to another waveguide is to use a mirror. The mirror may be stationary or may be used in a switching arrangement by connecting the mirror to a micromachine device. An alternative to using the mirror is to provide a plane of total internal reflection (TIR). As is known in the art, TIR occurs when a ray of light travels toward an interface between a region having a high refractive index and a region of low refractive index, with the ray of light approaching from the high index side of the interface. A switching arrangement that utilizes the phenomenon of TIR is described in U.S. Pat. No. 5,699,462 to Fouquet et al., which is assigned to the assignee of the present invention. An isolated switching unit 10 is shown in FIG. 1. The switching unit includes planar waveguides that are formed by layers on a substrate. The waveguide layers include a lower cladding layer 14, an optical core 16, and an upper cladding layer, not shown. The optical core may be primarily silicon dioxide, but with doping materials that achieve a desired index of refraction. The cladding layers are formed of a material having a refractive index that is significantly different than that of the core material, so that the optical signals are guided along the core. The effective phase index of the waveguide is determined by the refractive indices of the core material and the material of the cladding layers, as is well known in the art. The layer of core material is patterned into waveguide segments that define a first input waveguide 20 and a first output waveguide 26 of a first optical path. The patterning also defines a second input waveguide 24 and a second output waveguide 22 of a second linear path. The upper cladding layer is then deposited over the patterned core material. A gap is formed by etching a trench 28 through the core material, the upper cladding layer, and at least a portion of the lower cladding layer 14.

The first input waveguide 20 and the second output waveguide 22 have axes that intersect a sidewall of the trench 28 at an angle of incidence that results in TIR diverting light from the input waveguide 20 to the output waveguide 22 when the junction 30 of the waveguides is filled with vapor or gas. However, when the junction 30 is filled with a fluid that has an index of refraction substantially matching that of the effective phase index of the waveguides, light from the input waveguide 20 will travel through the index-matching fluid to the linearly aligned first output waveguide 26.

The patent to Fouquet et al. describes a number of alternative embodiments to switching the optical switching unit 10 between a transmitting state and reflecting state. In the transmitting state, the two input waveguides 20 and 24 are optically coupled to their linearly aligned output waveguides 26 and 22, respectively. In the reflecting state, the first input waveguide 20 is optically coupled to the second output waveguide 22, but the second input waveguide 24 is not in communication with either of the output waveguides 22 and 26. One approach to switching between the two states is illustrated in FIG. 1. The switching unit 10 includes a microheater 38 that controls formation of a bubble within the fluid-containing trench. When the heater is brought to a temperature that is sufficiently high to form a bubble in the index-matching fluid, the bubble is positioned at the junction 30 of the four waveguides. Consequently, light propagating along the waveguide 20 encounters a refractive index mismatch upon reaching the sidewall of the trench 28, causing TIR, so that the waveguides 20 and 22 are optically coupled. However, when the heater 38 is deactivated, the index-matching fluid will again reside within the junction between the four waveguides.

The principles described with reference to FIG. 1 also apply to a steady-state reflecting arrangement. That is, if the index-matching fluid is removed from the trench 28, the waveguides 20 and 22 will be continuously coupled by TIR at the wall of the trench. In this steady-state embodiment, the waveguides 24 and 26 would not be included.

While the phenomenon of TIR has been used successfully in the redirection of optical signals from one waveguide to another waveguide, further improvements are desired. Light that impinges an interface between a high refractive index region and a low refractive index region will vary between having a transverse electric (TE) polarization and having a transverse magnetic (TM) polarization. The light will react differently at the interface, depending upon its polarization. Consequently, there are polarization dependent losses (PDLs) due to imperfect coupling to the waveguide modes. Since light impinging the interface will randomly vary between polarizations, the variations in PDL are random.

What is needed is an optical coupling arrangement of waveguides in which polarization dependent losses are neutralized or rendered predictable. What is also needed is a method of determining efficient layouts for positioning waveguides relative to a TIR interface.

SUMMARY OF THE INVENTION

Optical efficiency in the coupling of two waveguides that intersect an interface between high and low refractive index regions is enhanced by determining compensation for the Goos-Hänchen effect along the interface. In one embodiment, the lateral shift of reflected light along the interface is predicted in order to determine a distance at which the axes of the two waveguides should be spaced apart along the interface. In another embodiment, the incidence angles of the two waveguides are selected so as to equalize the lateral shifts for the polarizations, since light collection by the second waveguide can be increased by selection of the proper angle, even if the spacing between the two waveguide axes remains fixed. In the preferred embodiment, both the distance between the axes and the incidence angles are selected to provide compensation for the Goos-Hänchen effect.

As previously noted, TIR occurs when a ray of light impinges the interface between the high and low refractive index regions from the high index side. However, the Goos-Hänchen effect causes the reflected light to emerge from the interface a short distance away from the point at which the incident light intersects the interface. By tailoring the positions and/or the angles of waveguides to maximize the collection of the reflected light, the reliability of signal processing can be improved. The optimal positioning is polarization dependent. That is, the lateral shift ($z_{TM}$) of light having a TM polarization is different than the lateral shift ($z_{TE}$) of light having a TE polarization. Reflection can be optimized for either the TM polarization or the TE polarization. Alternatively, the distance between the axes of the waveguides along the interface can be selected to equalize the loss for the two polarizations. By selecting the distance to be one-half of the difference between the two optimal points of the two polarizations, a zero-polarization dependent loss (PDL) for the reflection can be approached. This provides an acceptable overall low loss arrangement.

The lateral shift of light having the TM polarization may be calculated on the basis of the following equation:

$$z_{TM}=2(N^2-n_s^2)^{-1/2}\tan(\theta)/k(N^2/n_s^2+N^2/n_f^2-1) \quad \text{Eq. 1}$$

where $k=2\pi/\lambda$, $n_s$ is the low refractive index, $n_f$ is the high refractive index, $N=n\sin\theta$, $\theta$ is the angle of incidence, and $\lambda$ is the wavelength of the light. The lateral shift for light having the TE polarization may be determined using the following equation:

$$z_{TE}=2(N^2-n_s^2)^{-1/2}\tan(\theta)/k \quad \text{Eq. 2}$$

The $z_{TM}$ and $z_{TE}$ values can be converted using known trigonometric relations to a beam displacement from the position that the beam would be obtained if a geometrical reflection were to have occurred. The conversion can be used to determine the signal attenuation that would occur if two waveguides were at geometrical reflection positions. However, the loss can be eliminated by arranging the two waveguides to intersect the plane of total internal reflection such that the axes of the waveguides are spaced apart by the desired distance. This step of arranging the waveguides may be performed by fabricating the waveguides to end at a preselected plane that defines the interface. Alternatively, the waveguides can be fabricated to have intersecting axes, but then truncating along the plane that provides the desired spacing between the two axes. As previously noted, the spacing may be selected based solely upon the determination of $z_{TM}$, or solely upon the determination of $z_{TE}$, or upon the average between $z_{TM}$ and $z_{TE}$.

The incidence angles for a particular application of folding a beam path that includes propagation along two waveguides can be selected to minimize polarization dependent loss. Since the lateral shifts of Eq. 1 and Eq. 2 are dependent upon the incidence angle ($\theta$), the selection of the equal angles of incidence of the two waveguides relative to the normal of the interface is a function of the refractive index ($n_f$) of the waveguides (i.e., the effective phase index of the waveguides) and the refractive index ($n_2$) of the region on a side of the interface opposite to the waveguides. Solving Eq. 1 and Eq. 2 for the condition that provides a substantially equal shift for the two polarizations provides the alternative equations:

$$\sin(\theta)=(2/(n_f^2/n_s^2+1))^{1/2} \quad \text{Eq. 3}$$

and $$\theta=\arcsin((2/(n_f^2/n_s^2+1))^{1/2}) \quad \text{Eq. 4}$$

Similar to the determination of axial displacement along the interface, the incidence angle can be optimized for one polarization or the other, but Eq. 4 is preferably used to determine the condition in which the polarization dependent loss is theoretically zero. As one example of an implementation, if $n_s$ is the refractive index of air and the waveguides are formed of materials that provide an effective phase index ($n_f$) in the range of 1.30 to 1.60, the range of incidence angles determined using Eq. 4 will be 48° to 60°.

DETAILED DESCRIPTION

Figure 2:
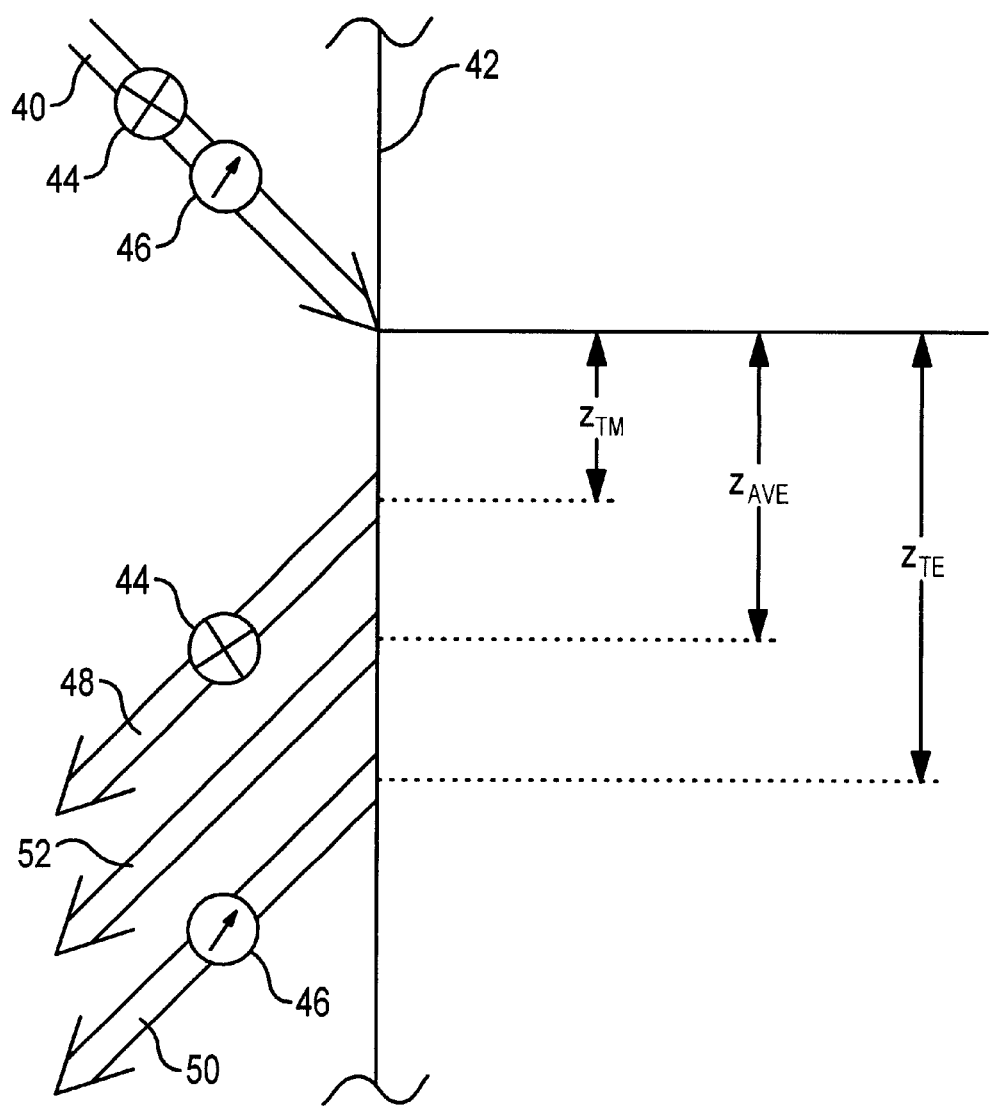
FIG. 2 is a representation of total internal reflection as a result of the Goos-Hänchen effect.

With reference to FIG. 2, total internal reflection occurs when input light 40 that is propagating along an optical path having a high refractive index impinges upon an interface 42 that is the boundary to a region having a low refractive index. For example, the low refractive index region may be an air-filled region. The input light 40 randomly varies between having a transverse electric polarization and a transverse magnetic polarization. The two polarizations are represented by symbols 44 and 46 in FIG. 2. As a result of the phenomenon known as the Goos-Hänchen effect, the reflected light emerges from the interface 42 at a short distance from the point at which the input light 40 impinges the interface. The distance will depend upon the current polarization of the input light. In FIG. 2, the output light 48 having a TM polarization is shown as emerging at a shorter distance ($z_{TM}$) from the point of impingement than the distance ($z_{TE}$) from which output light 50 having a TE polarization emerges.

In view of the Goos-Hänchen effect, a designer of an optical coupling arrangement may elect to optimize coupling of light having a particular polarization by positioning an output waveguide at either the location of output beam 48 or the location of output beam 50. Thus, the distance between the axes of an input waveguide and an output waveguide would be either $z_{TM}$ or $z_{TE}$. On the other hand, the designer may attempt to provide a zero polarization dependent loss by positioning the output waveguide at the distance shown as $z_{AVE}$, which is the average of distances $z_{TM}$ and $z_{TE}$.

Forming a highly efficient optical coupling arrangement also requires consideration of the incidence angles of the waveguides. As will be explained more fully below, the incidence angle is one factor in determining the lateral shift from the beam axis of input light 40 to the beam axes of the two polarization-dependent output lights 48 and 50. By selecting the proper angles of the waveguides, the same shift of the two polarizations can be achieved, so that an output beam 52 has a theoretical polarization dependent loss of zero. The angle at which this occurs depends on the refractive indices of the waveguides and the region on the opposite side of the interface 42.

Figure 1:
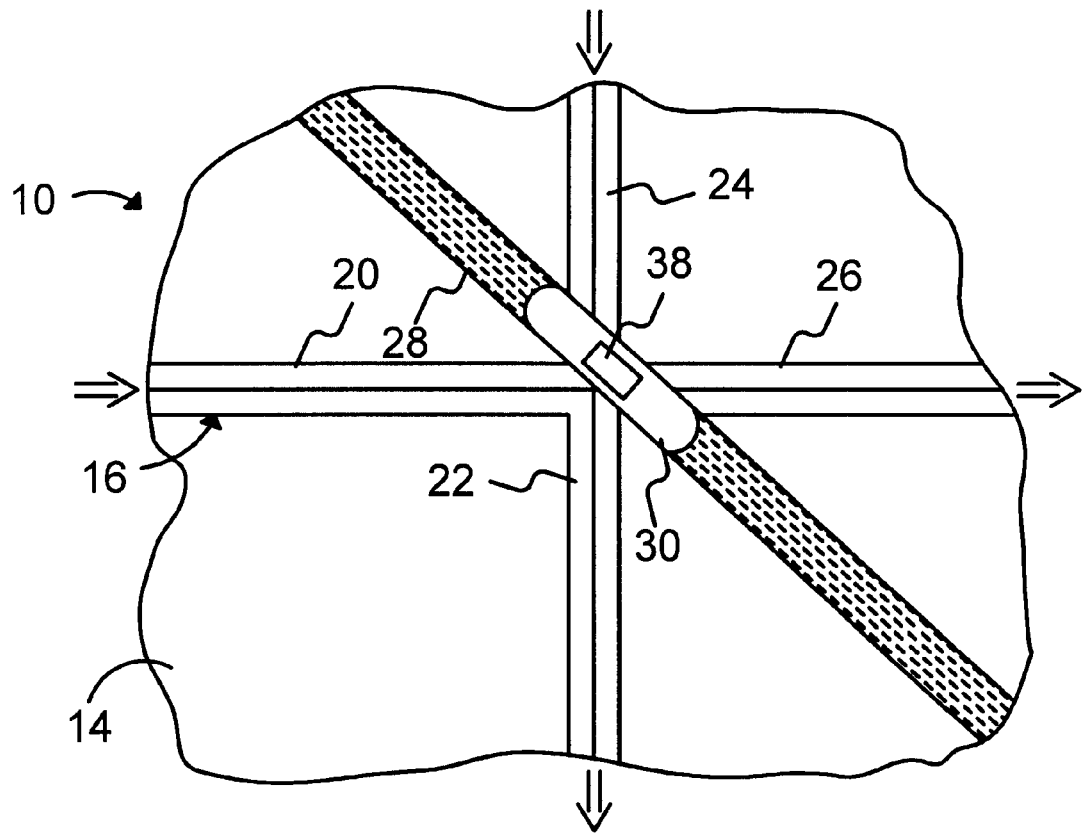
FIG. 1 is a top view of an optical switching unit that utilizes total internal reflection in accordance with the prior art.
Figure 3:
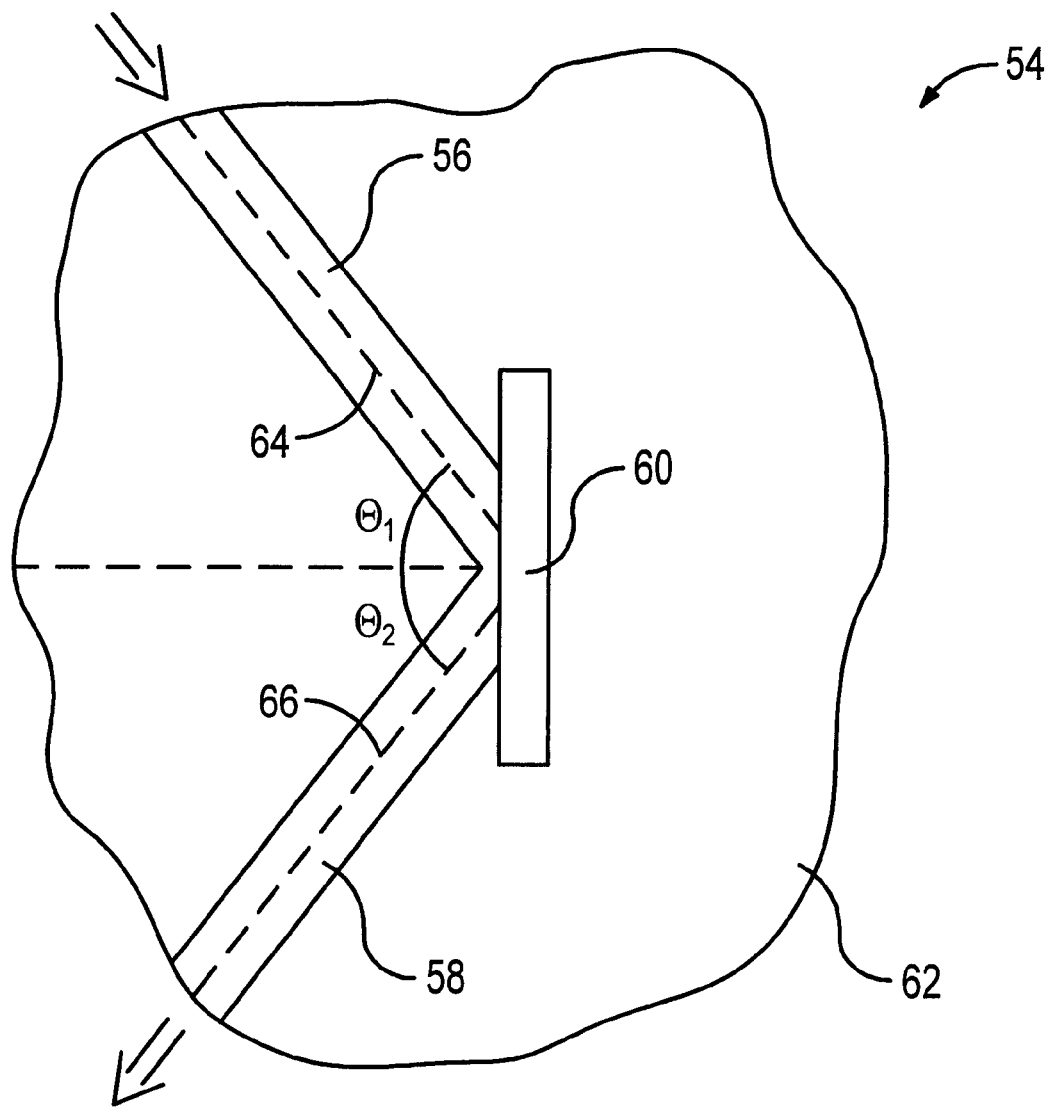
FIG. 3 is a top view of a steady-state optical switching arrangement in accordance with the invention.

Referring now to FIG. 3, a steady-state optical coupling arrangement 54 is shown as including an input waveguide 56 and an output waveguide 58 that intersect a trench 60. The waveguides are formed on a substrate 62. The structure of the waveguides may be identical to the structure described with reference to FIG. 1. That is, the waveguides may be formed of a patterned layer of silicon dioxide that is doped to provide a waveguide core having a desired refractive index, with cladding layers being formed around the core to trap propagating light within the core material. However, the use of doped silicon dioxide to form waveguides is not critical to the invention. The trench 60 may be formed by etching the core material and the cladding layers to provide an air-filled region, so that the refractive index is significantly lower than the effective phase index of the waveguides. However, other techniques for achieving an interface between higher and lower refractive indices may be employed.

The input waveguide 56 has an axis 64 that intersects the wall of the trench 60 at a point that is spaced apart from the point of intersection of an axis 66 of the output waveguide 58. Total internal reflection provides a folded beam path as light from the input waveguide 56 impinges upon the sidewall of the trench 60. By tailoring the positions and/or the angles of the waveguides to maximize the collection of the reflected light, the reliability of signal processing can be enhanced. The angles of incidence are equal, but are shown separately in FIG. 3 as being the angle $\theta_1$ between the input waveguide axis 64 and the normal of the sidewall of the trench 60 and the angle $\theta_2$ between the output waveguide axis 66 and the normal to the sidewall of the trench. If the angles $\theta_1$ and $\theta_2$ are fixed, the distance between the points at which the axes 64 and 66 intersect the sidewall of the trench 60 may be varied. For example, there may be applications in which the waveguides are formed but the position of the trench 60 is negotiable, so that any one of the three distances $z_{TM}$, $z_{TE}$ or $z_{AVE}$ of FIG. 2 may be established by precisely etching the trench 60 in the appropriate location. On the other hand, there may be applications in which the distance between the intersection points of the waveguide axes upon the trench is fixed, but the incidence angle is negotiable. Depending upon the application, the geometry of the waveguides and the interface is selected to provide efficient coupling from the input waveguide 56 to the output waveguide 58.

While the waveguides 56 and 58 will be described as being input and output waveguides, bidirectional coupling is available in the geometry shown in FIG. 3. That is, a beam which is introduced to the waveguide 58 from an external source will reflect from the sidewall of the trench 60 to the waveguide 56 at an efficiency that equals the efficiency of propagation in the opposite direction.

For a given incidence angle, the lateral shift of light having the TM polarization may be calculated on the basis of the following equation:

$$z_{TM}=2(N^2-n_s^2)^{-\frac{1}{2}} \tan(\theta)/k(N^2/n_s^2+N^2/n_f^2-1) \quad \text{Eq. 1}$$

where $k=2\pi/\lambda$, $n_f$ is the refractive index (effective phase index) of the waveguides, $n_s$ is the refractive index of the region within the trench 60, $N=n\sin\theta$, $\theta$ is the incidence angle, and $\lambda$ is the wavelength of the light beam. For an application in which a goal is to optimize the coupling of the input waveguide 56 to the output waveguide 58 with respect to light having the TM polarization, this equation may be used. The result is that there will be a high polarization dependent loss, since the optical coupling arrangement will be polarization preferential. However, the polarization selectivity may be desired in some applications.

In any applications in which selectivity of light having the TE polarization is desired, the following equation may be used:

$$z_{TE}=2(N^2-n_s^2)^{-\frac{1}{2}} \tan(\theta)/k \quad \text{Eq. 2}$$

By spacing apart the axes of the input and output waveguides 56 and 58 by the distance $z_{TE}$, the coupling arrangement will be preferential to light having the desired polarization.

In a third application, the goal is to minimize the polarization dependent loss for the reflection from the input waveguide 56 to the output waveguide 58. For a given waveguide incidence angle, this may be achieved by separating the two waveguide axes 64 and 66 by a distance that is the average of $z_{TM}$ and $z_{TE}$. As a result, the transmission into the receiving waveguide 58 has a transfer coefficient that is approximately Gaussian with respect to the offset between the center of the beam of light and the axis 66 of the receiving waveguide. Therefore, the signal loss is predictable and within acceptable tolerances.

In another embodiment, the angle of incidence is selected in order to achieve an optically efficient coupling arrangement between the input waveguide 56 and the output waveguide 58. By selecting the proper incidence angle, the two polarizations will experience the same lateral shift. The condition that provides the same shift for the two polarizations is determined by the formula:

$$\text{sine}(\theta)=(2/(n_f^2/n_s^2+1))^{1/2} \quad \text{Eq. 3}$$

That is, the angle between each waveguide axis 64 or 66 and a line that is perpendicular to the sidewall of the trench 60 is determined by:

$$\theta=\arcsin((2/(n_f^2/n_s^2+1))^{1/2}) \quad \text{Eq. 4}$$

Thus, if the refractive index $(n_f)$ of the waveguide material and the refractive index $(n_s)$ of the trench region are known, the incidence angle can be readily calculated. As an example, if $n_s$ is the refractive index of air and the waveguides are formed of materials that provide a refractive index $(n_f)$ in the range of 1.30 to 1.60, the range of incidence angles determined using Eq. 3 is indicated in Table 1. It should be noted that the refractive index referred to within Table 1 is the effective phase index of the waveguide, which means that a typical waveguide would require an incidence angle of approximately 53°.

TABLE 1

| $n_f$ | $\theta$, degrees |
|---|---|
| 1.30 | 59.59 |
| 1.32 | 58.66 |
| 1.34 | 57.77 |
| 1.36 | 56.92 |
| 1.38 | 56.10 |
| 1.40 | 55.30 |
| 1.42 | 54.53 |
| 1.44 | 53.78 |
| 1.46 | 53.06 |

TABLE 1-continued

| $n_f$ | θ, degrees |
|---|---|
| 1.48 | 52.36 |
| 1.50 | 51.68 |
| 1.52 | 51.02 |
| 1.54 | 50.38 |
| 1.56 | 49.76 |
| 1.58 | 49.15 |
| 1.60 | 48.56 |

Figure 4:
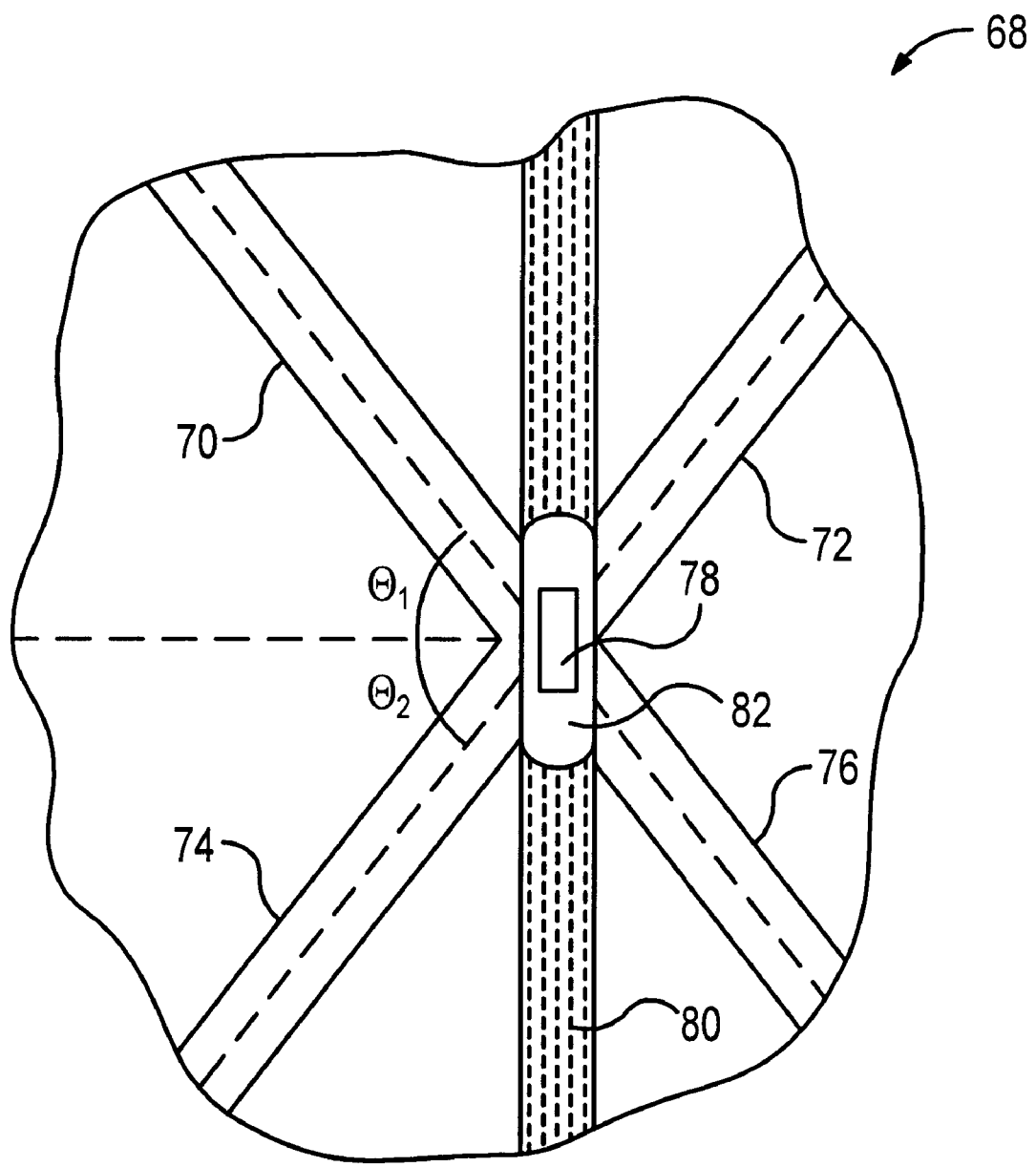
FIG. 4 is a top view of a switching arrangement in accordance with the invention.

FIG. 4 illustrates a switching arrangement 68 in accordance with the invention. The switching arrangement includes two input waveguides 70 and 72 and two output waveguides 74 and 76. The switching arrangement is shown in a reflecting state in FIG. 4. In this state, a microheater 78 is activated to heat fluid 80 within a trench 82. The fluid has a refractive index that substantially matches the effective phase index of the waveguides. One acceptable fluid is isopropyl alcohol. The activation of the microheater 78 causes a gas bubble to be formed at the junction of the four waveguides, thereby creating a total internal reflection interface at the sidewall of the trench 82.

When the switching arrangement 68 is in the reflecting state of FIG. 4, the input waveguide 70 is optically coupled to the output waveguide 74. Thus, light propagating along the input waveguide 70 is reflected at the sidewall of the trench 82 into the output waveguide 74. On the other hand, the axis of the waveguide 76 is sufficiently spaced apart from the axis of the input waveguide 72 to prevent optical coupling between the input and output waveguide 72 and 76. However, in some embodiments, it may be desirable to provide optical coupling between input waveguide 72 and output waveguide 76.

When the microheater 78 is deactivated, the fluid 80 within the trench 82 will occupy the portion of the trench 82 at the junction of the four waveguides 70, 72, 74 and 76. Because the fluid has a refractive index which substantially matches the effective phase index of the waveguides, the switching arrangement 68 will be in a transmitting state. Signals introduced via the input waveguide 70 will propagate through the index-matching fluid to the output waveguide 76. Similarly, optical signals introduced via the input waveguide 72 will propagate through the fluid to the output waveguide 74. Other approaches to manipulating fluid relative to the junction of the four waveguides may be substituted. For example, the techniques used in inkjet printheads may be used to fire the index-matching fluid from the junction of the waveguides, with capillary action being used to replenish the fluid.

Figure 5:
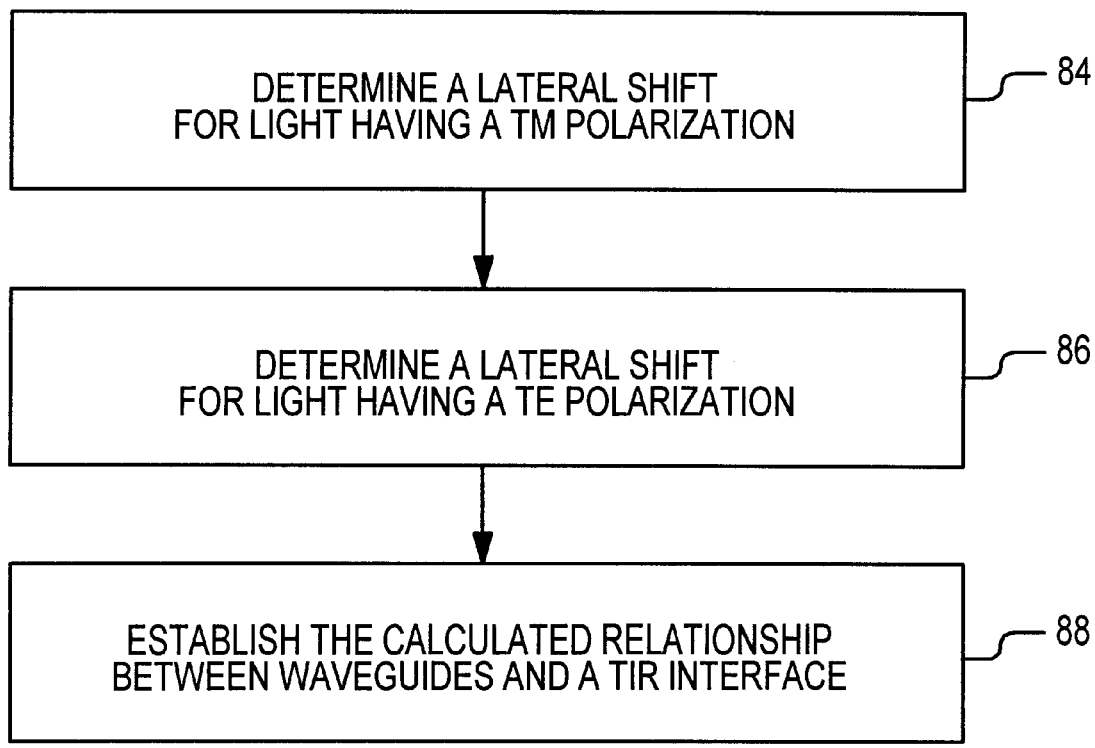
FIG. 5 is a process flow of steps for implementing one embodiment of the invention.

Referring now to FIG. 5, one embodiment for providing an efficient optical coupling of waveguides using a total internal reflection (TIR) interface includes a step 84 of determining a lateral shift for light having a TM polarization. This step may be carried out using Eq. 1. In step 86, the lateral shift of light having a TE polarization is determined. The calculation may be based on Eq. 2. Optionally, only one of the steps 84 and 86 is utilized, since there may be applications in which coupling of only one of the TM polarized light or the TE polarized light is preferred.

In step 88, the calculated relationship between the waveguides and a TIR interface is established. In one implementation of this step, the waveguides are patterned relative to a fixed TIR interface. In an alternative implementation, the waveguides are fabricated to have intersecting axes, but waveguide material is then etched to form the TIR interface at the desired location, with the axes being spaced apart at the TIR interface as described with reference to FIGS. 3 and 4.

Figure 6:
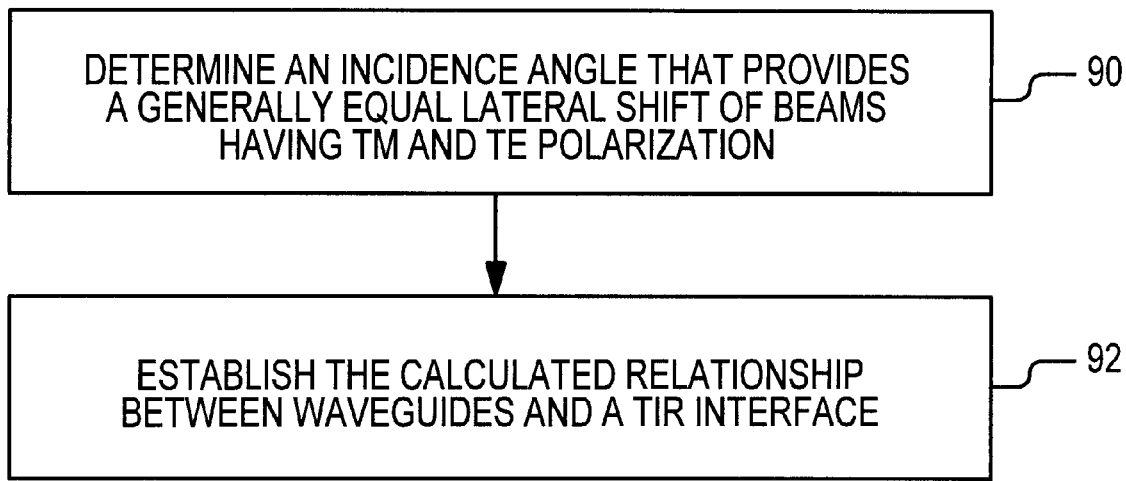
FIG. 6 is a process flow of steps for implementing an alternative or additional embodiment of the invention.

As an alternative or additional process for providing an efficient optical coupling arrangement of waveguides, step 90 of FIG. 6 includes determining the incidence angle that provides a generally equal lateral shift of beams having TM and TE polarizations. Eq. 4 may be used in implementing step 90. The determination of the incidence angle is then used at step 92 to establish a calculated relationship between each of the waveguides and a TIR interface. As a result, a polarization dependent loss of approximately zero is achieved simultaneously with a reflection loss of zero.

What is claimed is:

1. An optical coupling arrangement comprising:
   a first optical waveguide having a first axis and a first end; and
   a second optical waveguide having a second axis and a second end, said first and second ends being positioned along a common interface such that a change in refractive index at said interface induces reflection of light from said first optical waveguide to said second optical waveguide and inhibits propagation of said light through said interface, said first and second axes being spaced apart at said interface by a distance selected to compensate for Goos-Hänchen effect occurring as a consequence of light reflection along said interface, said distance between said first and second axes thereby enhancing collection of said light reflected to said second optical waveguide by said interface.

2. The optical coupling arrangement of claim 1 wherein said interface is a boundary of a change in refractive index from a relatively high refractive index of said first and second optical waveguides to a lower refractive index, said Goos-Hänchen effect being a lateral shift ($z_s$) of light impinging said interface from said first optical waveguide.

3. The optical coupling arrangement of claim 2 wherein said first and second axes are spaced apart from each other along said interface by an offset that is between a lateral shift of light having a transverse magnetic (TM) polarization and a lateral shift of light having a transverse electric (TE) polarization.

4. The optical coupling arrangement of claim 3 wherein said lateral shift ($z_{TM}$) of said light having said TM polarization is $$z_{TM}=2(N^2-n_s^2)^{-\frac{1}{2}}\tan(\theta)/k(N^2/n_s^2+N^2/n_f^2-1)$$

and where said lateral shift ($z_{TE}$) of said light having said TE polarization is $$z_{TE}=2(N^2-n_s^2)^{-\frac{1}{2}}\tan(\theta)/k$$

where $k=2\pi/\lambda$, $n_f$ is said relatively high refractive index, $n_s$ is said lower refractive index, $N=n_f \sin \theta$, $\theta$ is the angle of incidence of said light to said interface, and $\lambda$ is the wavelength of said light.

5. The optical coupling arrangement of claim 2 wherein said first and second axes are spaced apart along said interface by an offset that is based upon high efficiency coupling of one of light having a TM polarization and light having a TE polarization.

6. The optical coupling arrangement of claim 1 wherein said first and second optical waveguides are at angles $\theta_1$ and $\theta_2$, respectively, to the normal of said interface, said angles being selected to compensate for Goos-Hänchen effect at said interface.

7. The optical coupling arrangement of claim 6 wherein each said angle $\theta_1$ and $\theta_2$ is determined on a basis that said angle is generally equal to arcsine$((2/(n_f^2/n_s^2+1))^{1/2})$, where $n_f$ is a refractive index of said first and second optical waveguides and where $n_s$ is a refractive index at said interface, said angles being equal.

8. The optical coupling arrangement of claim 1 further comprising:

a fluid having an index of refraction substantially matching an effective phase index of said first and second optical waveguides; and a mechanism for manipulating said fluid relative to said first and second ends, thereby providing a reflecting state in which said fluid is absent from said first and second ends and a transmitting state in which said fluid is present at said first and second ends to accommodate propagation of light from said first and second optical waveguides through said interface.

9. A method of optically coupling a first waveguide to a second waveguide comprising the steps of:

determining a lateral shift of rays of light propagating from said first waveguide to impinge on a plane of total internal reflection so that said rays of light are reflected from said first waveguide to said second waveguide as a direct consequence of a change in refractive index at a region of said plane aligned with said first waveguide, said determination of said lateral shift being based on factors that include refractive indices of said first waveguide and said region of said plane aligned with said first waveguide; and arranging said first and second waveguides to intersect said plane of total internal reflection such that axes of said first and second waveguides are spaced apart at said plane by a distance that is based upon said determination of lateral shift.

10. The method of claim 9 wherein said step of determining said lateral shift includes calculating a Goos-Hänchen effect along said plane.

11. The method of claim 10 wherein said step of arranging said first and second waveguides includes forming adjacent waveguide ends along said plane, said plane being a boundary of a gas-filled region.

12. The method of claim 11 further comprising, a step of manipulating a fluid relative to said waveguide ends to selectively decouple said first and second waveguides.

13. The method of claim 9 further comprising a step of calculating substantially equal incidence angles of said first and second waveguides relative to the normal of said plane, including at least partially basing said calculating on Goos-Hänchen effects, said step of arranging said first and second waveguides including establishing said incidence angles.

14. The method of claim 9 wherein said step of determining said lateral shift includes basing said determination of said refractive indices, an angle of incidence of said first waveguide to the normal of said plane, and a wavelength of said light.

15. A method of optically coupling a first waveguide to a second waveguide comprising the steps of:

determining angles of incidence of said first and second waveguides relative to the normal of a plane of total internal reflection, including utilizing an effective phase index of said first and second waveguides and a refractive index of a region on a side of said plane opposite to said first and second waveguides;

determining a lateral shift of light impinging said plane from said first waveguide; and arranging said first and second waveguides to intersect said plane of total internal reflection such that axes of said first and second waveguides are along said determined angles of incidence, including spacing apart said axes at said plane by a distance that is based upon said determining lateral shift.

16. The method of claim 15 wherein said step of determining said angles includes calculating each said angle to be generally equal to arcsine$((2/(n_f^2/n_s^2+1))^{1/2})$, where $n_f$ is said effective phase index of said first and second waveguides and where $n_s$ is said index of refraction of said region.

17. The method of claim 16 wherein said step of arranging said first and second waveguides includes using a waveguide having said $n_f$ in the range of 1.30 to 1.60, such that said angles are within the range of 48° to 60° when said $n_s$ is the refractive index of air.

* * * * *